United States Patent [19]

Spruyt

[11] Patent Number: 5,636,253

[45] Date of Patent: Jun. 3, 1997

[54] METHOD FOR DETECTING ERASURES IN RECEIVED DIGITAL DATA

[75] Inventor: Paul Spruyt, Heverlee, Belgium

[73] Assignee: Alcatel N.V., Rijswijk, Netherlands

[21] Appl. No.: 435,205

[22] Filed: May 5, 1995

[51] Int. Cl.⁶ .............. H03D 1/06; H03D 11/04; H03K 5/01; H03K 6/04
[52] U.S. Cl. .............. 375/348; 329/304; 371/37.1
[58] Field of Search .............. 375/317, 340, 375/261, 264, 348; 371/6, 31, 57.1, 43, 44, 37.1; 329/304, 306; 455/296

[56] References Cited

U.S. PATENT DOCUMENTS

| | | | |
|---|---|---|---|
| 5,121,395 | 6/1992 | Millar | 371/39.1 |
| 5,226,062 | 7/1993 | Fluharty | 375/343 |
| 5,323,424 | 6/1994 | Fazel et al. | 375/279 |

OTHER PUBLICATIONS

R. Blauhut, "Theory and Practice of Error Control Codes", Addison Wesley Publishing Co, Reading, 1983, pp. 6–15 & 198–199.

B. Sklar, "Digital Communications—Fundamentals and Applications", Prentice Hall Int'l Editions, 1988, pp. 357–364, 412–417 & 738–743.

Primary Examiner—Tesfaldet Bocure
Assistant Examiner—Bryan Webster
Attorney, Agent, or Firm—Ware, Fressola, Van Der Sluys & Adolphson LLP

[57] ABSTRACT

A method is described for detecting erasures in a stream of sets of digital signal values received at a receiver side after transmission from a transmission side. Subsets of these sets are modulated on distinct carrier signals, each transmitted and received thus modulated carrier signal corresponding to one of a number of predetermined subset related points and to a receipt point on a carrier dependent modulation representing map respectively. The method includes the steps of:

selecting for each receipt point the nearest of the predetermined subset related points;
  calculating a distance between the receipt point and the nearest subset related point and multiplying this distance with a map dependent weight factor;
  summing the thus obtained weighted distances for all subsets of a set; and
  marking the latter set as an erasure when the thus obtained result exceeds a predetermined threshold.

7 Claims, 3 Drawing Sheets

METHOD FOR DETECTING ERASURES IN RECEIVED DIGITAL DATA

TECHNICAL FIELD

The present invention relates to a method for detecting erasures in a stream of sets of digital signal values received at a receiver side after transmission from a transmission side.

BACKGROUND OF THE INVENTION

In this context, an erasure means a faulty set having a known position in the stream, and is thus different from an error which indicates a faulty set having an unknown position in the stream. Such a method is already known in the art, e.g. from the book 'Theory and practice of error control codes', by R. E. Blahut, published by Addison-Wesley Publishing Company, Reading, 1983, pp. 11 and 199. Therein, it is used in a receiver which processes the stream of sets of digital signal values and declares a set erased either when it is received ambiguously (p. 11), or when presence of interference or a transient malfunction is detected (p. 11), or when various internal validity checks fail (p. 199). However, from this book it is not clear at all which criterion should be used to decide when a set is received ambiguously, or when interference or a transient malfunction is present, or which internal validity checks should be performed.

The advantage of being able to detect whether a set is erased or not becomes apparent when the stream of digital signal values is encoded according to an error-correcting code having a so-called minimum distance d. Indeed, in that case, a number of R errors and E erasures in this bit stream may be corrected when $2 \times R + E + 1 \leq d$. Thus, by detecting erasures the error correcting capability of the code is doubled for a given minimum distance d. This may be appreciated from the fact that half the error correcting work, specifically the work locating faulty digital signal values in the stream, is already performed when an erasure is detected.

DISCLOSURE OF INVENTION

An object of the present invention is to provide a method of the above known type, but which is fully elaborated.

According to the invention, this object is achieved due to the fact that subsets of said sets of digital signal values are modulated on distinct carrier signals, each transmitted and received thus modulated carrier signal corresponding to one of a number of predetermined subset related points and to a receipt point on a carrier dependent modulation representing map respectively, and that said method includes the steps selecting for each said receipt point the nearest of said predetermined subset related points;

calculating a distance between said receipt point and said nearest subset related point and multiplying this distance with a map dependent weight factor;

summing the thus obtained weighted distances for all subsets of a set; and marking the latter set as an erasure when the thus obtained result exceeds a predetermined threshold.

The invention is based on the insight that the transmitted stream is submitted to noise before being received at the receiver side, and that in general this noise is additive white gaussian noise corrupting only a limited number of digital signal values per set, whereas occasionally short bursts of so-called impulse noise may occur corrupting close to all digital signal values of a set. Thus, when during transmission of a set impulse noise occurs, this set had best be marked as an erasure. The above method provides a criterion for deciding whether impulse noise occurs or not. It is to be noted that modulation parameters such as power allocated to the various carrier signals and the modulation representing map, and encoding techniques for encoding the stream of digital signal values are chosen to cope with the additive white gaussian noise but not with the impulse noise.

Indeed, when the transmitted stream is submitted to additive white gaussian noise before being received at the receiver side, the receipt point for each carrier is close to the one of the subset related points which corresponds to the respective transmitted modulated carrier signal. As a consequence, the nearest subset related point is most likely constituted by the latter subset related point. Thus, an interpretation of the receipt point as the nearest subset related point is most probably correct. Furthermore, the distance between the nearest subset related point and the receipt point, which is a measure of the noise to which the received stream has been submitted, is probably small. By weighing this distance or noise measure with the map dependent weight factor it is in fact normalized and has a probability distribution with a small mean distance. When the thus normalized distances or noise measures are then summed for all modulated carriers, an average normalized distance is obtained which has a gaussian probability distribution with a mean equal to the above small mean distance and a variance which is inversely proportional to N, N being the number of carriers over which the normalized distances are summed.

On the other hand, when the transmitted stream is submitted to impulse noise, this impulse noise having a relatively flat probability distribution characteristic compared to that of the additive white gaussian noise, the relation between the receipt point and the one of the subset related points which corresponds to the respective transmitted modulated carrier signal is fully corrupted for all carriers. As a consequence, an interpretation of the receipt point as the nearest subset related point is most probably wrong and each subset had best be marked as erased. Furthermore, the mean distance between the nearest subset related point and the receipt point is relatively large. By weighing this distance with the weight factor normalized distances are obtained which have a probability distribution with a relatively large mean distance. When these normalized distances are then summed for all modulated carriers, an average normalized distance is obtained which has a gaussian probability distribution with a mean equal to the above relatively large mean distance and a variance which is inversely proportional to N, N being the number of carriers over which the normalized distances are summed.

To be noted that both the additive white gaussian noise and the impulse noise have a relatively flat power spectrum whereby all carrier frequencies are equally affected by them.

It may be appreciated from the above, and it will become apparent later, that the obtained sum has a gaussian probability distribution which in case of additive white gaussian noise has a lower mean value than in case of impulse noise, and that in both cases the variance on this value is low. Thus, by comparing the obtained sum with the predetermined threshold a criterion is provided for deciding whether the subsets of a set are only slightly corrupted (gaussian noise) or fully corrupted (impulse noise). This threshold is so chosen that the probability for an erroneous decision is minimized.

Another characteristic feature of the present invention is that for each said carrier the transmit power and said carrier dependent modulation representing map are chosen such that a required signal quality characteristic for a said subset modulated on the respective carrier is met.

In this way, the probability distribution function of the receipt point around the one of said subset related points which corresponds to the respective transmitted modulated carrier signal, is equivalent for all carrier signals, i.e. the integral of the probability distribution function over the so-called decoding region associated to the latter subset related point is the same for all carrier signals, this integral indeed corresponding to the required signal quality characteristic. Thus, by choosing the map dependent weight factor inversely proportional to the standard deviation of the respective probability distribution function, this standard deviation being function of the area of the respective decoding regions, an effective normalization of the distances may be obtained.

Another characteristic feature of the present invention providing a general criterion for choosing the map dependent weight factor is that said map dependent weight factor is function of a distance between said nearest subset related point and those of said predetermined subset related points which therewith have a bisecting plane which forms part of a border of a decoding region associated to said nearest subset related point, said decoding region including all possible receipt points for which the latter nearest subset related point is the nearest subset related point.

Thereby, the latter distance indeed being proportional to the standard deviation of the respective probability distribution function when the above signal quality characteristic is met, a criterion is provided for choosing the map dependent weight factor for arbitrary modulation representing maps.

A further feature of the present invention providing a choice of the map dependent weight factor is that said carrier dependent modulation representing map corresponds to an M-ary quadrature amplitude modulation scheme, M being carrier dependent, and in that said map dependent weight factors are proportional to the square root of M.

In this way, since the square root of M is inversely proportional to the distance referred to in the previous characteristic feature, an effective value for the map dependent weight factor is provided.

Still another feature of the invention is that said stream of sets of digital signal values is encoded according to a predetermined error correcting code, in that a said set is marked as erased by providing an associated mark signal indicative of such erasure, and in that said method includes additional step of decoding said stream according to said error correcting code and taking said mark signal into account.

In this way, as is clear from the above, the method for detecting erasures leads to an increase of the error correcting capabilities of the error correcting code.

Yet a further characteristic feature of the present invention is that said distance is the Manhattan distance between said receipt point and said nearest subset related point.

In this way, a fair trade-off is reached between the effectiveness of the distance in providing a criterion for differentiating between additive white gaussian noise and impulse noise, and the complexity of calculating it. To be noted that the Manhattan distance refers to the sum of the positive distances between corresponding coordinates of the transmit and receipt points.

These and other objects, features and advantages of the present invention will become more apparent in light of the detailed description of a best mode embodiment thereof, as illustrated in the accompanying drawing.

BRIEF DESCRIPTION OF THE INVENTION

BEST MODE FOR CARRYING OUT THE INVENTION

Figure 1:
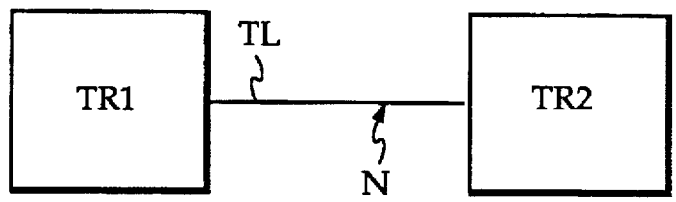
FIG. 1 shows a known communication system in which a method for detecting erasures according to the invention may be used.

The communication system shown in FIG. 1 includes a transceiver TR1 coupled to a transceiver TR2 via a transmission line TL. Digital signals exchanged between both transceivers TR1 and TR2 are submitted to noise N as schematically represented in FIG. 1. These digital signals are modulated on a plurality of carriers as described for instance in the U.S. Pat. No. 4,679,227. Therein, bits of data to be transmitted and power are allocated to each of the carriers such that, given actual noise characteristics of the transmission line, a same bit error rate is obtained for all data modulated on the various carriers. In general, the transmission line TL may be described as a so-called additive gaussian channel wherein signals transferred therethrough are submitted to gaussian noise with zero mean value and standard deviation $\sigma$. As will be explained later such gaussian noise causes a received signal to have characteristics which with high probability are only slightly changed with respect to those of the transmitted signal. However, due to electromagnetic induction or interference of external sources, e.g. originating from neighbouring transmission lines carrying so-called telephone ringing currents, signals transferred via the transmission line TL may be submitted to impulse noise which has a flat probability distribution function up to relatively high noise values, and which fully corrupts the transmitted signal as will become clear later. To be noted that both the additive white gaussian noise and the impulse noise have a relatively flat power spectrum whereby they equally affect all carrier frequencies.

The bits to be transmitted are arranged in sets of bits which in successive time intervals are modulated on the carrier signals. In each time interval respective subsets of the corresponding set are modulated on the respective carriers, the number of bits included in a subset and thus allocated to the corresponding carrier being so chosen that indeed a same bit error rate is obtained for all carrier modulated subsets.

Figure 3:
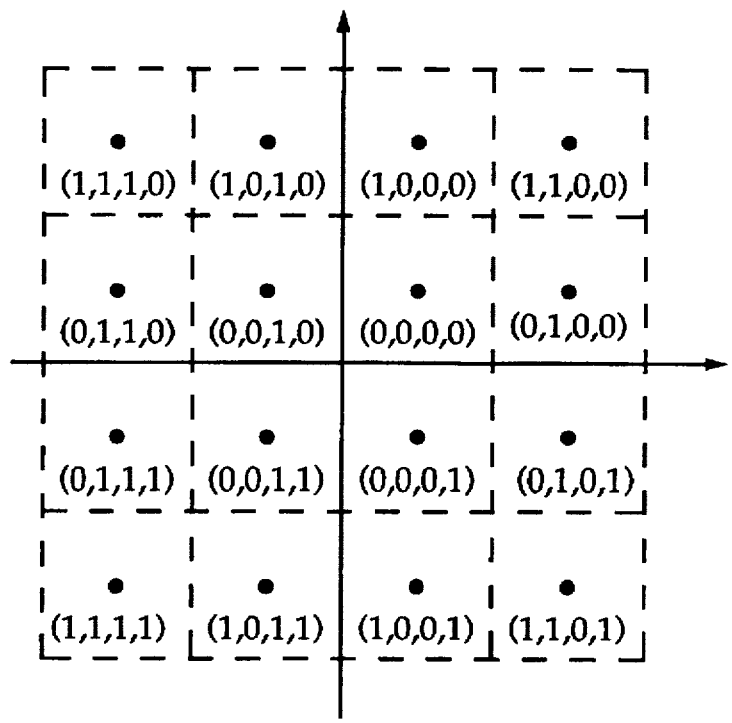
FIG. 3 shows a modulation representing map for so-called 16-QAM.

The bits allocated to a carrier are modulated thereon according to a so-called Quadrature Amplitude Modulation (QAM) scheme which may be represented by a modulation representing map constituted by a constellation of points in a signal space as shown for instance in FIG. 3 for case of so-called 16-QAM, this modulation representing map being applicable when 4 bits are allocated to the carrier. In this scheme each point corresponds to one 4-bit value, for instance as represented in FIG. 3, and represents a relative amplitude and the phase of the carrier to be transmitted. The 4-bit value corresponding to each such point of the modulation representing map may thus be transmitted by transmitting a cosine wave having an amplitude proportional to the abscissa of this point, the so-called in-phase component, combined with a sine wave having an amplitude proportional to the ordinate of this point, the so-called quadrature component. In this way, an M-ary QAM modulation representing map is allocated to each carrier, $\log_2 M$ being at least equal to the number of bits included in the subset to be modulated on this carrier, and various choices of the modulation representing map being possible as described for instance in the book "Digital Communications—fundamentals and applications" by B. Sklar, published by Prentice-Hall International Editions, 1988, pp. 412–417. To be noted that in a preferred embodiment $\log_2 M$ will be equal to the latter number of bits.

Figure 2:
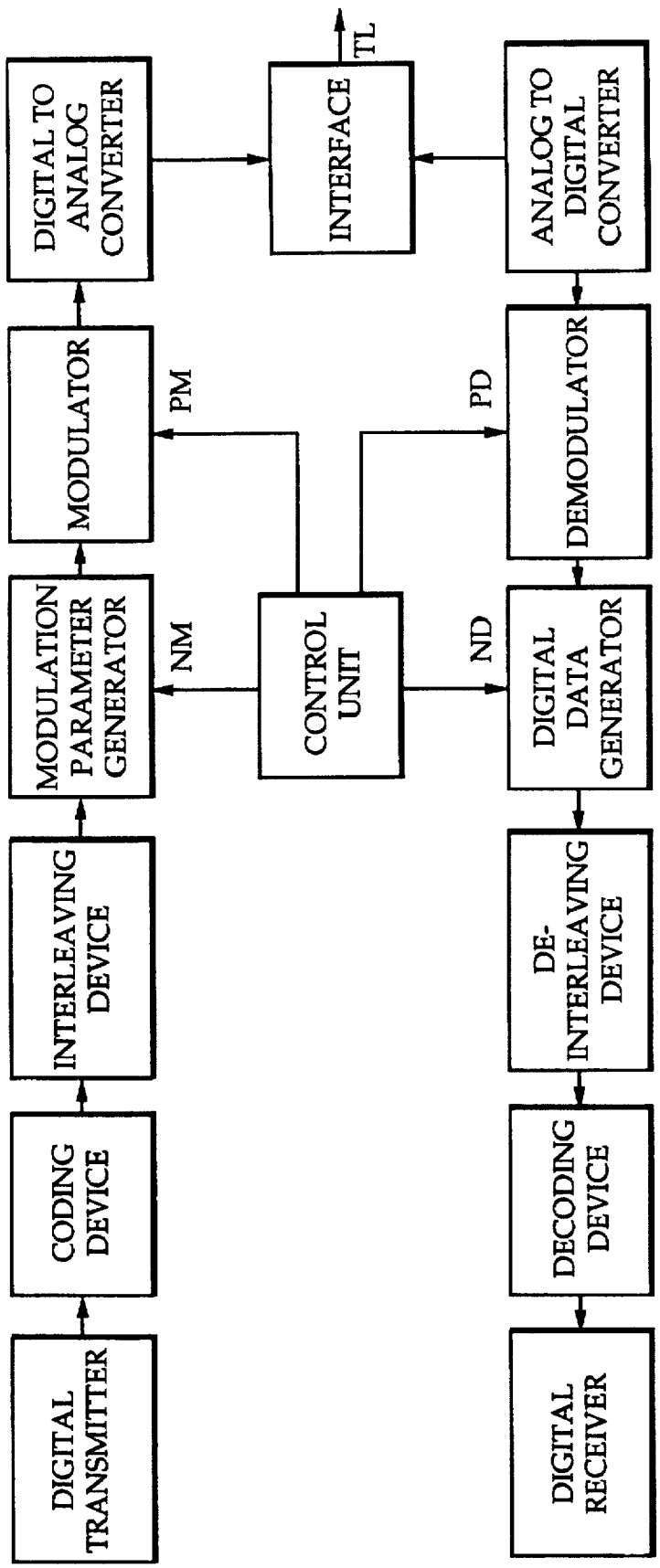
FIG. 2 represents a transceiver TR used in FIG. 1.

Each of the transceivers TR1 and TR2 according to the invention is built as a transceiver TR shown in FIG. 2. This transceiver TR includes a transmission and a receipt branch both coupled to the transmission line TL via an interface INF. The transmission branch includes the cascaded connection of a digital transmitter DTR, a coding device COD, an interleaving device INL, a modulation parameter generator MPG, a modulator MOD and a digital to analog convertor DAC connected to INF, while the receipt branch includes connected to INF the cascaded connection of an analog to digital convertor ADC, a demodulator DEM, a digital data generator DDG, a de-interleaving device DIL, a decoding device DEC and a digital receiver DRE. The transceiver TR furthermore includes a control unit CTR providing control signals NM and PM to the modulation parameter generator MPG and the modulator MOD respectively, as well as control signals ND and PD to the digital data generator DDG and the demodulator DEM respectively.

The transceiver TR transmits and receives digital signals via the transmission line TL. Such a digital signal to be transmitted via TL is constituted by a bit stream produced by the digital transmitter DTR and applied to the coding device COD. Therein the bits of this bit stream are encoded according to an error-correcting code whereby an encoded bit stream is produced. Such error-correcting codes are well known in the art and are described for instance in the above mentioned book by Blahut. The encoded bit stream is thereupon applied to the interleaving device INL where it is submitted to the technique of interleaving which is well known in the art and described e.g. in the above mentioned book by Sklar, pp. 357–364. The thus interleaved bit stream is then applied to the modulation parameter generator MPG. Therein, a subset of bits is allocated to each carrier and transformed into a point of the modulation representing map allocated to this carrier, the number of bits in this subset and this modulation representing map being indicated by the control signal NM provided by the control unit CTR to MPG. To be noted that in a preferred embodiment the number of bits included in the subset is uniquely related to an allocated modulation representing map so that only this number of bits needs to be indicated by the control signal NM. Thus, for each carrier a point of the modulation representing map, i.e. a relative amplitude for a cosine wave, i.e. the in-phase component, and a relative amplitude for a sine wave, i.e. the quadrature component, is applied to the modulator MOD wherein the respective carriers are accordingly modulated. The thus modulated carrier is then amplified to a value corresponding to the power allocated to it as indicated by the control signal PM supplied by the control unit CTR to the modulator MOD. In a preferred embodiment the modulator MOD performs an inverse Fast Fourier Transform (FFT) with the points of the modulation representing maps applied to it as inputs. A modulated digital signal is then generated and thereupon converted to an analog signal by the digital to analog convertor DAC and applied to the transmission line TL via the interface INF.

A signal received via the transmission line TL is via the interface INF applied to the analog to digital convertor ADC where it is converted into a digital signal which is then demodulated in the demodulator DEM taking the power allocated to the various carriers into account, this power being indicated by the control signal PD provided by the control unit CTR to the demodulator DEM, thereby obtaining for each carrier a receipt point of the corresponding modulation representing map, i.e. a relative amplitude for a cosine wave, i.e. the in-phase component, and a relative amplitude for a sine wave, i.e. the quadrature component. In a preferred embodiment the demodulator DEM performs a FFT on the digital signal thereby generating receipt points of the modulation representing maps for the various carriers. These points are then applied to the digital data generator DDG wherein they are converted to the bits corresponding thereto as indicated by the modulation representing map allocated to the respective carrier, this modulation representing map being indicated by the control signal ND supplied by the control unit CTR to DDG by indicating the number of bits included in the subsets modulated on the respective carriers. The thus obtained bit stream is then submitted to the technique of de-interleaving by the de-interleaving device DIL, this technique being the opposite of the above technique of interleaving, and thereupon decoded by the decoding device DEC according to the above error-correcting code whereafter it is processed in the digital receiver DRE.

Thus, a block of bits modulated on a carrier corresponds to a point of a modulation representing map as for instance represented in FIG. 3 for 6-QAM. Due to noise on the transmission line TL a transmitted signal thus corresponding to one of these points, henceforth referred to as transmit point, and transmitted for instance by TR1 is received in TR2 and then corresponds to a receipt point which may also be represented in the modulation representing map but is probably distinct from the transmit point. Having been submitted to additive white gaussian noise on the transmission line TL, the in-phase and quadrature components of the receipt point have a gaussian probability distribution $$N(m, \sigma) = \frac{1}{\sqrt{2\pi} \; \sigma} e^{-\frac{b-m^2}{2\sigma^2}}$$

with a mean value m equal to the in-phase and quadrature components of the transmit point respectively, and with a standard deviation $\sigma$. Since power and data have been allocated to each carrier such that the data modulated thereon is received in TR2 with a same bit error rate for all carriers, this standard deviation $\sigma$ is inversely proportional to $\sqrt{M}$ for the case of M-ary QAM. Indeed, this bit error rate is equal to the volume under the associated gauss clock outside the so-called decoding region associated to a transmit point, the decoding region being shown in FIG. 3 as bisecting planes shown by the dashed squares around each possible transmit point. Thus, it may be appreciated that this volume is equal for all carriers when the standard deviation σ is proportional to the length of a side of a square of the corresponding modulation representing map, this length indeed being inversely proportional to $\sqrt{M}$. For both the in-phase and quadrature components this error probability is approximately equal to $$P_{err} = 2 \int_\alpha^\infty \frac{1}{\sqrt{2\pi}\,\sigma} e^{-\frac{t^2}{2\sigma^2}} dt =$$

$$2 \int_{\frac{\alpha}{\sigma}}^\infty \frac{1}{\sqrt{2\pi}} e^{-\frac{u^2}{2}} du = \operatorname{erfc}\left(\frac{\alpha}{\sqrt{2}\,\sigma}\right),$$

half the length of a side of the square, erf(x)=1−erf(x) is the complementary error function, erf(x) being the error function, and where $$\frac{\alpha}{\sigma}$$

is the same for all carriers due to the said proportionality. Thus, when for instance an error probability of the modulated QAM signal less than $2 \times 10^{-7}$ is imposed which corresponds to $P_{err} \leq 10^{-7}$, then it may be verified that $$\frac{\alpha}{\sqrt{2}\,\sigma} \geq 3.77.$$

When the transmitted signal is submitted to impulse noise the probability distribution function of the receipt point is almost flat over the entire modulation representing map, i.e. the receipt point may with equal probability be found to be anywhere on this modulation representing map.

The average distance of the in-phase and quadrature, components of the receipt point from the transmit point is equal to $$A = \int_{-\alpha}^\alpha p(x)|x|dx = 2 \int_0^\alpha p(x)x\,dx,$$

wherein p(x) is the probability distribution function of the receipt point around the corresponding transmit point which without loss of generality is located at x equal to 0. For gaussian noise this average distance may be calculated to be approximately equal to $$\sqrt{\frac{2}{\pi}}\,\sigma(1 - e^{-\frac{\alpha^2}{2\sigma^2}}).$$

For the above value of $$\frac{\alpha}{\sigma}$$

this may be calculated to be less than or equal to 0.15α. On the other hand, when the signal has been submitted to impulse noise on the transmission line, this average distance may be calculated to be 0.5α. Thus, in both cases (gaussian noise and impulse noise) a distance is obtained with an average value as given above and with a gaussian probability distribution thereabout whose standard deviation is given by $$\int_{-\alpha}^\alpha p(x)(|x| - A)^2 dx = 2 \int_0^\alpha p(x)(x - A)^2 dx.$$

For gaussian noise this standard deviation may be calculated to be $$\sigma^2 \left\{ -\frac{2}{\sqrt{2\pi}}\,\frac{\alpha}{\sigma}\,e^{-\frac{\alpha^2}{2\sigma^2}} + \left(1 + \frac{2}{\pi}(1 - e^{-\frac{\alpha^2}{2\sigma^2}})^2\right)\operatorname{erf}\left(\frac{\alpha}{\sigma\sqrt{2}}\right) - \frac{4}{\pi}(1 - e^{-\frac{\alpha^2}{2\sigma^2}})^2 \right\}$$

which for the above value of $$\frac{\alpha}{\sigma}$$

may be shown to be less or equal to $0.013\alpha^2$, whereas for impulse noise it may be shown to be $$\frac{\alpha^2}{12} = 0.083\,\alpha^2.$$

Figure 4:
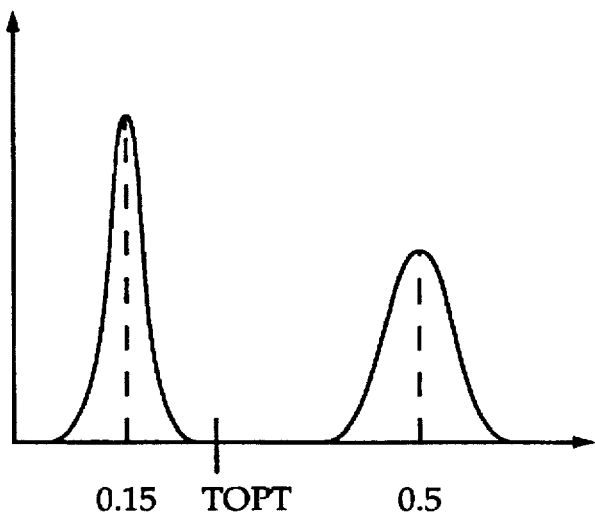
FIG. 4 shows the probability distribution functions for an average normalized distance in case of both gaussian and impulse noise.

By now calculating the weighted sum $$\frac{1}{2N} \sum_N \frac{|x_i| + |y_i|}{\alpha_i},$$

where $x_i$ is the above distance between the in-phase components, $Y_i$ is the above distance between the quadrature components, and $\alpha_i$ is the above half length of a square side, both for carrier i, and N is the total number of modulated carriers over which the sum is calculated, a parameter is obtained with a gaussian probability distribution whose standard deviation is inversely proportional to $\sqrt{N}$. In case of gaussian Noise the mean and standard deviation of this distribution are found to be less than or equal to $\overline{m_g} = 0.15$ and $$\sigma_G = \sqrt{\frac{0.013}{N}}$$

respectively, whereas in case of impulse noise they are found to be $\overline{m_I} = 0.5$ and $$\sigma_I = \frac{1}{\sqrt{12N}}$$

respectively. Both distributions for this parameter for N equal to 100 are shown in FIG. 4. From this FIG. 4 it is intuitively clear that when the above weighted sum is calculated and compared to a threshold in between both average values 0.15 and 0.5, a fairly good decision may be made as to whether the signal has been submitted to gaussian noise or to impulse noise.

An optimal value TOPT for this threshold may be chosen in accordance with the so-called maximum likelihood criterion described for instance in the above book by Sklar on pp. 738–743. This optimal value TOPT of the threshold is such that the probability of an erroneous decision in case of gaussian noise is equal to the probability of an erroneous decision in case of impulse noise. These probabilities are $$\int_{TOPT}^{\infty} \frac{1}{\sqrt{2\pi}\ \sigma_G} e^{-\frac{(x-m_G)^2}{2\sigma_G^2}} dx$$

and $$\int_{-\infty}^{TOPT} \frac{1}{\sqrt{2\pi}\ \sigma_I} e^{-\frac{(x-m_I)^2}{2\sigma_I^2}} dx$$

respectively, wherefrom the optimal threshold may be calculated to be less than or equal to $$TOPT = \frac{m_I \sigma_G + m_G \sigma_I}{\sigma_G + \sigma_I}.$$

Figure 5:
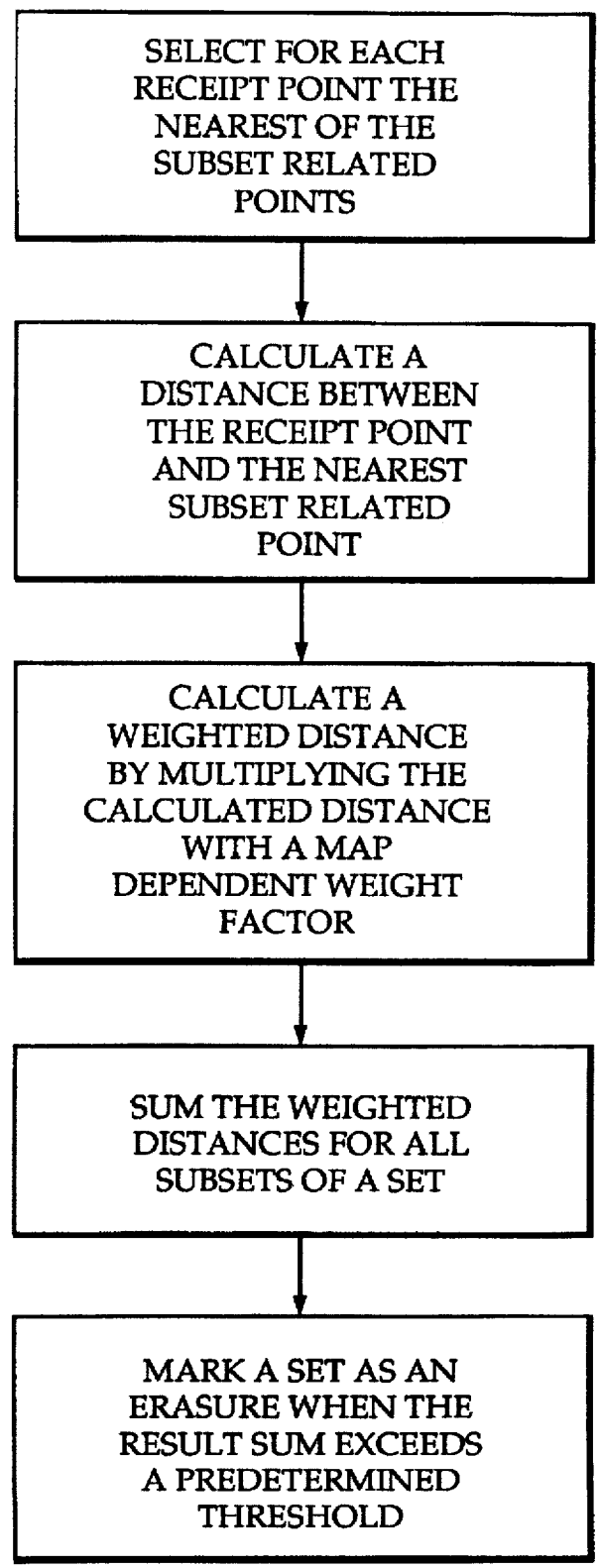
FIG. 5 is a logic flow diagram of the method for detecting erasures according to the invention.

The method of the invention may be carried out in accordance with the logic flow diagram of FIG. 5.

While the principles of the invention have been described above in connection with specific apparatus, it is to be clearly understood that this description is made only by way of example and not as a limitation on the scope of the invention.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Method for detecting erasures in a stream of sets of digital signal values received at a receiver side after transmission from a transmission side, each set in said stream of sets representing one symbol, characterized in that a subset of each of said sets of digital signal values is modulated on a distinct carrier signal, each transmitted and received thus modulated carrier signal corresponding to one of a umber of predetermined subset related points and to a receipt point on a carrier dependent modulation representing map respectively, and that said method includes the steps of:

selecting for each receipt point a nearest point of said predetermined subset related points;

calculating a weighted distances between said receipt point and said nearest of said predetermined subset related points by multiplying the distance between said receipt point and said nearest of said predetermined subset related points by a map dependent weight factor having a value that depends on the receipt point, wherein said map dependent weight factor is a function of a distance between said nearest point of said predetermined subset related points and those of said predetermined subset related points which therewith have a bisecting plane which forms part of a border of a decoding region associated to said nearest subset related point, said decoding region including all possible receipt points for which the latter nearest subset related point is the nearest subset related point;

summing, to obtain a result sum, the weighted distance calculated for each said receipt point for all subsets of a set; and marking a set as an erasure when the result sum exceeds a predetermined threshold.

2. Method according to claim 1, characterized in that said carrier dependent modulation representing map corresponds to an M-ary quadrature amplitude modulation scheme, M being carrier dependent, and in that each said map dependent weight is proportional to the square root of M.

3. Method for detecting erasures in a stream of sets of digital signal values received at a receiver side after transmission from a transmission side, each set in said stream of sets representing one symbol, characterized in that a subset of each of said sets of digital signal values is modulated on a distinct carrier signal corresponding to one of a number of predetermined subset related points and to a receipt point on a carrier dependent modulation representing map respectively, and that said method includes the steps of;

selecting for each said receipt point a nearest point of said predetermined subset related points;

calculating a weighted distance between said receipt point and said nearest of said predetermined subset related points by multiplying the distance between said receipt point and said nearest of said predetermined subset related points by a map dependent weight factor having a value that depends on the receipt point;

summing, to obtain a result sum, the weighted distance calculated for each said receipt point for all subsets of a set;

marking a set as an erasure when the result sum exceeds a predetermined threshold, wherein for each said error a transmit power and said carrier dependent modulation representing map are chosen such that a required signal quality characteristic for a said subset modulated on a respective carrier is met; and wherein said signal quality characteristic is an error probability of said digital signal values included in said subsets.

4. Method for detecting erasures in a stream of sets of digital signal values received at a receiver side after transmission from a transmission side, each set in said stream of sets representing one symbol, characterized in that a subset of each of said sets of digital signal values is modulated on a distinct carrier signal, each transmitted and received thus modulated carrier signal corresponding to one of a number of predetermined subset related points and to a receipt point on a carrier dependent modulation representing map respectively, and that said method includes the step of:

selecting for each said receipt point nearest point of said predetermined subset related points;

calculating weighted distance between said receipt point and said nearest of said predetermined subset related points by multiplying the distance between said receipt point and said nearest of said predetermined subset related points by a map dependent weight factor having a value that depends on the receipt point, wherein said distance is a Manhattan distance between said receipt point and said nearest of said predetermined subset related points;

summing, to obtain a result sum, the weighted distance calculated for each said receipt point for all subsets of a set; and marking a set as an erasure when the result sum exceeds a predetermined threshold.

5. Method according to claim 4, characterized in that for each said carrier a transmit power and said carrier dependent modulation representing map are chosen such that a required signal quality characteristic for a said subset modulated on a respective carrier is met.

6. Method according to claim 4, characterized in that said stream of sets of digital signal values is encoded according to a predetermined error correcting code, in that a said set is marked as erased by providing an associated mark signal indicative of such erasure, and in that said method includes an additional step of decoding said stream according to said error correcting code and taking said mark signal into account.

7. Method according to claim 3, characterized in that said carrier dependent modulation representing map corresponds to an M-dry quadrature amplitude modulation scheme, M being carrier dependent, and in that each said map dependent weight is proportional to the square root of M.

* * * * *

UNITED STATES PATENT AND TRADEMARK OFFICE
CERTIFICATE OF CORRECTION

PATENT NO. : 5,636,253
DATED : June 3, 1997
INVENTOR(S) : Paul Spruyt

It is certified that error appears in the above-indentified patent and that said Letters Patent is hereby corrected as shown below:

Column 9, line 43 (claim 1) "umber" should read --number--

Column 10, line 16 (claim 3) ";" should read --:--

Column 10, line 21 (claim 3) "between said receipt" should read --between said receipt point--

Column 10, line 30 (claim 3) "wherein for each said error" should read --wherein for each said carrier--

Column 12, line 6 (claim 7) "to an M-dry" should read --to an M-ary--

Signed and Sealed this

Nineteenth Day of August, 1997

*Attest:*

BRUCE LEHMAN

*Attesting Officer*   *Commissioner of Patents and Trademarks*